(12) United States Patent
Suen et al.

(10) Patent No.: US 7,623,658 B2
(45) Date of Patent: Nov. 24, 2009

(54) METHOD AND SYSTEM FOR IMPLEMENTING THE A5/3 ENCRYPTION ALGORITHM FOR GSM AND EDGE COMPLIANT HANDSETS

(75) Inventors: Ruei-Shiang Suen, Dublin, CA (US); Srinivasan Surendran, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 888 days.

(21) Appl. No.: 10/924,214

(22) Filed: Aug. 23, 2004

(65) Prior Publication Data

US 2006/0039553 A1    Feb. 23, 2006

(51) Int. Cl.
*H04L 9/00* (2006.01)
*H04K 9/00* (2006.01)
*H04L 9/28* (2006.01)

(52) U.S. Cl. .............................. 380/44; 380/28; 380/37; 380/259; 380/270

(58) Field of Classification Search ..................... 380/44
See application file for complete search history.

(56) References Cited

U.S. PATENT DOCUMENTS

| 5,381,480 | A * | 1/1995 | Butter et al. | 380/37 |
| 7,184,549 | B2 * | 2/2007 | Sorimachi et al. | 380/37 |
| 7,212,631 | B2 * | 5/2007 | Averbuj et | 380/37 |
| 2004/0047466 | A1 * | 3/2004 | Feldman et al. | 380/37 |
| 2004/0131180 | A1 * | 7/2004 | Mazuz et al. | 380/37 |
| 2004/0156499 | A1 * | 8/2004 | Heo et al. | 380/37 |
| 2005/0226407 | A1 * | 10/2005 | Kasuya et al. | 380/28 |

OTHER PUBLICATIONS

ARIB STD-T63-35.201 V4.1.0 3G Security; Specification of the 3GPP Confidentiality and Integrity Algorithms; Document 1: f0 and f9 Specification (Release 4).*
3GPP Organizational Partners, "3rd Generation Partnership Project: Technical Specification Group Services and Systems Apects, 3G Security, Specification of the 3GPP Confidentiality and Integrity Algorithms, Document 2: KATSUMI Specification (Release 5)" 2002.
3GPP Organizational Partners, "3rd Generation Partnership Project: Technical Specification Group Services and Systems Aspects, 3G Security, Specification of the A5/3 Encryption Algorithms for GSM and ECSD, and the GEA3 Encryption Algorithm for GPRS, Document 1: A5/3 and GEA3 Specifications (Release 6)" 2002.

* cited by examiner

*Primary Examiner*—William R Korzuch
*Assistant Examiner*—Bryan Wright
(74) *Attorney, Agent, or Firm*—McAndrews, Held & Malloy, Ltd.

(57) ABSTRACT

In a wireless communication system, a method and system for implementing the A5/3 encryption algorithm for GSM and EDGE compliant handsets are provided. Input variables may be initialized in a keystream generator and an intermediate value may be generated with a cipher key parameter and a key modifier. A number of processing blocks of output bits may be determined based on a number of bits in an output keystream. The processing blocks of output bits may be generated utilizing a KASUMI operation and may be based on an immediately previous processing block of output bits, the intermediate value, and an indication of the processing block of output bits being processed. The processing blocks of output bits may be generated after an indication that an immediately previous processing block of output bits is available and may be grouped into two final blocks of output bits in the output keystream.

30 Claims, 6 Drawing Sheets

METHOD AND SYSTEM FOR IMPLEMENTING THE A5/3 ENCRYPTION ALGORITHM FOR GSM AND EDGE COMPLIANT HANDSETS

CROSS-REFERENCE TO RELATED APPLICATIONS/INCORPORATION BY REFERENCE

This application makes reference to:
U.S. application Ser. No. 10/924,002 filed Aug. 23, 2004;
U.S. application Ser. No. 10/923,954 filed Aug. 23, 2004;
U.S. application Ser. No. 10/924,219 filed Aug. 23, 2004; and
U.S. application Ser. No. 10/924,177 filed Aug. 23, 2004.

The above stated applications are hereby incorporated herein by reference in their entirety.

FIELD OF THE INVENTION

Certain embodiments of the invention relate to cryptography. More specifically, certain embodiments of the invention relate to a method and system for implementing the A5/3 encryption algorithm for GSM and EDGE compliant handsets.

BACKGROUND OF THE INVENTION

In wireless communication systems, the ability to provide secure and confidential transmissions becomes a highly important task as these systems move towards the next generation of data services. Secure wireless transmissions may be achieved by applying confidentiality and integrity algorithms to encrypt the information to be transmitted. For example, the Global System for Mobile Communication (GSM) uses the A5 algorithm to encrypt both voice and data and the General Packet Radio Service (GPRS) uses the GEA algorithm to provide packet data encryption capabilities in GSM systems. The next generation of data services leading to the so-called third generation (3G) is built on GPRS and is known as the Enhanced Data rate for GSM Evolution (EDGE). Encryption in EDGE systems may be performed by either the A5 algorithm or the GEA algorithm depending on the application. One particular EDGE application is the Enhanced Circuit Switch Data (ECSD).

There are three variants of the A5 algorithm: A5/1, A5/2, and A5/3. The specifications for the A5/1 and the A5/2 variants are confidential while the specifications for the A5/3 variant are provided by publicly available technical specifications developed by the 3rd Generation Partnership Project (3GPP). Similarly, three variants exist for the GEA algorithm: GEA1, GEA2, and GEA3. The specifications for the GEA3 variant are also part of the publicly available 3GPP technical specifications while specifications for the GEA1 and GEA2 variants are confidential. The technical specifications provided by the 3GPP describe the requirements for the A5/3 and the GEA3 algorithms but do not provide a description of their implementation.

Variants of the A5 and GEA algorithms are based on the KASUMI algorithm which is also specified by the 3GPP. The KASUMI algorithm is a symmetric block cipher with a Feistel structure or Feistel network that produces a 64-bit output from a 64-bit input under the control of a 128-bit key. Feistel networks and similar constructions are product ciphers and may combine multiple rounds of repeated operations, for example, bit-shuffling functions, simple non-linear functions, and/or linear mixing operations. The bit-shuffling functions may be performed by permutation boxes or P-boxes. The simple non-linear functions may be performed by substitution boxes or S-boxes. The linear mixing may be performed using XOR operations. The 3GPP standards further specify three additional variants of the A5/3 algorithm: an A5/3 variant for GSM, an A5/3 variant for ECSD, and a GEA3 variant for GPRS (including Enhanced GPRS or EGPRS).

The A5/3 variants for GSM and ECSD may utilize the KASUMI algorithm in an Output Feedback Mode (OFB) as a keystream generator. All three variants of the A5/3 algorithm may be specified in terms of a general-purpose keystream function KGCORE. The individual encryption algorithms for GSM and ECSD may be defined by mapping their corresponding inputs to KGCORE function inputs, and mapping KGCORE function outputs to outputs of each of the individual encryption algorithms. The heart of the KGCORE function is the KASUMI cipher block, and this cipher block may be used to implement the A5/3 algorithm.

Implementing the variants of the A5/3 algorithm directly in an A5/3 algorithm block or in a KGCORE function block, however, may require ciphering architectures that provide fast and efficient execution in order to meet the transmission rates, size and cost constraints required by next generation data services and mobile systems. Because of their complexity, implementing the variants of the A5/3 algorithm in embedded software to be executed on a general-purpose processor on a system-on-chip (SOC) or on a digital signal processor (DSP), may not provide the speed or efficiency necessary for fast secure transmissions in a wireless communication network. Moreover, these processors may need to share some of their processing or computing capacity with other applications needed for data processing and/or transmission, further limiting processing resources available for encryption applications. The development of cost effective integrated circuits (IC) capable of accelerating the encryption and decryption speed of the GSM and EDGE variants of the A5/3 algorithm is necessary for the deployment of next generation data services.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for implementing the A5/3 encryption algorithm for GSM and EDGE compliant handsets. Aspects of the method may comprise initializing a keystream generator with input variables. An intermediate value may be generated based on the input variables, a cipher key parameter and a key modifier, and may be utilized to generate an output keystream. Determining a number of processing blocks of output bits may be based on a number of output bits that are to be generated for the output keystream. The determined number of processing blocks of output bits may be 4 for GSM applications and 11 for ECSD applications.

After generating a first processing block of output bits of the determined number of processing blocks of output bits and a signal indicating when the first processing block of output bits is generated, at least one additional processing block of output bits may be generated. The additional processing block of output bits may be generated utilizing an immediately generated previous processing block of output bits, the generated intermediate value, the cipher key parameter, and an indication corresponding to a processing block of output bits being processed. The indication corresponding to a processing block of output bits being processed may be generated by counting the number of occurrences of a signal indicating when an immediately generated previous processing block of output bits is generated. Generating additional processing blocks of output bits may be done for all subsequent determined number of processing blocks of output bits after the signal indicating when an immediately generated previous processing block of output bits is generated. Moreover, the immediately generated previous processing block of output bits may be pipelined transferred from a previous processing stage to a current processing stage when the signal indicating that the immediately generated previous processing block of output bits is generated.

A modified cipher key parameter may be generated by XORing the cipher key parameter and the key modifier. The intermediate value may be generated by performing a KASUMI operation on the input variables with the modified cipher key parameter after a signal is generated to indicate that the KASUMI operation is to begin. By XORing the generated intermediate value and the indication corresponding to a processing block of output bits being processed, a first processing input may be generated. Similarly, at least one additional processing input may be generated by XORing the immediately generated previous processing block of output bits with the result of XORing the generated intermediate value and the indication corresponding to a processing block of output bits being processed.

The input to the KASUMI operation may be selected from the input variables and the generated processing inputs. The first processing block of output bits may be generated by performing a KASUMI operation on the generated first processing input with the cipher key parameter after a signal is generated to indicate that the KASUMI operation is to begin. Similarly, the additional processing block of output bits may be generated by performing a KASUMI operation on the generated additional processing inputs with the cipher key parameter after a signal is generated to indicate that the KASUMI operation is to begin. At least a portion of a set of subkeys utilized during a KASUMI operation may be generated from the cipher key parameter after a generated signal indicates that the set of subkeys may be created.

The method may also comprise generating two final blocks of output bits after a signal is generated to indicate that a final processing block of output bits has been created, wherein a first of the two final blocks of output bits comprises a portion of the number of output bits and a second of the two final blocks of output bits comprises a remaining portion of the number of output bits in the output keystream. A signal may be generated to indicate that a final processing block of output bits has been generated when the indication corresponding to a processing block of output bits being processed corresponds to a last of the determined number of processing blocks of output bits.

Aspects of the system may comprise circuitry for initializing a keystream generator with input variables. Circuitry may be provided to generate an intermediate value based on the input variables, a cipher key parameter and a key modifier, and may be utilized to generate an output keystream. Circuitry may also be provided to determine a number of processing blocks of output bits based on a number of output bits that are to be generated for the output keystream. The determined number of processing blocks of output bits may be 4 for GSM applications and 11 for EDGE applications.

Additional circuitry may be provided to generate a first processing block of output bits of the determined number of processing blocks of output bits and a signal indicating when the first processing block of output bits is generated. Circuitry may also be provided to generate at least one additional processing block of output bits. The additional processing block of output bits may be generated with circuitry that utilizes an immediately generated previous processing block of output bits, the generated intermediate value, the cipher key parameter, and an indication corresponding to a processing block of output bits being processed. Circuitry may be provided to generate the indication corresponding to a processing block of output bits being processed by counting the number of occurrences of a signal indicating when an immediately generated previous processing block of output bits is generated. Generating additional processing blocks of output bits may be done for all subsequent determined number of processing blocks of output bits after circuitry generates a signal indicating when an immediately generated previous processing block of output bits. Moreover, circuitry may be provided to pipeline transfer the immediately generated previous processing block of output bits from a previous processing stage to a current processing stage when the signal indicating that the immediately generated previous processing block of output bits is generated.

A modified cipher key parameter may be generated by circuitry that performs the XORing of the cipher key parameter and the key modifier. The intermediate value may be generated by circuitry that performs a KASUMI operation on the input variables with the modified cipher key parameter after a signal is generated to indicate that the KASUMI operation is to begin. Circuitry may be provided that performs the XORing of the generated intermediate value and the indication corresponding to a processing block of output bits being processed to generate a first processing input. Similarly, circuitry may also be provided to generate at least one additional processing input by XORing the immediately generated previous processing block of output bits with the result of XORing the generated intermediate value and the indication corresponding to a processing block of output bits being processed.

Circuitry may be provided to select the input to the KASUMI operation from the input variables and the generated processing inputs. The first processing block of output bits may be generated by circuitry that performs a KASUMI operation on the generated first processing input with the cipher key parameter after a signal is generated to indicate that the KASUMI operation is to begin. Similarly, the additional processing block of output bits may be generated by circuitry that performs a KASUMI operation on the generated additional processing inputs with the cipher key parameter after a signal is generated to indicate that the KASUMI operation is to begin. Circuitry may also be provided to generate at least a portion of a set of subkeys utilized during a KASUMI operation from the cipher key parameter after a generated signal indicates that the set of subkeys may be created.

The system may also comprise circuitry for generating two final blocks of output bits after a signal is generated to indicate that a final processing block of output bits has been created. A first of the two final blocks of output bits comprises a portion of the number of output bits and a second of the two final blocks of output bits comprises a remaining portion of the number of output bits in the output keystream. Circuitry may also be provided to generate a signal that indicates that a final processing block of output bits has been generated when the indication corresponding to a processing block of output bits being processed corresponds to a last of the determined number of processing blocks of output bits.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for implementing the A5/3 encryption algorithm for GSM and EDGE compliant handsets. A finite state machine may be utilized to control the operation and data processing of a keystream generator system based on whether the input frame is from a Global System for Mobile Communication (GSM) application or from an Enhanced Circuit Switch Data (ECSD) application. A plurality of processing stages may be controlled by the finite state machine, where each processing stage may reuse a plurality of processing hardware blocks in the keystream generator system in accordance to the selected mode of operation. This approach may provide a cost effective integrated circuit (IC) solution capable of accelerating the encryption and decryption speed of GSM and EDGE variants of the A5/3 algorithm and allow for a faster deployment of next generation data services.

Figure 1:
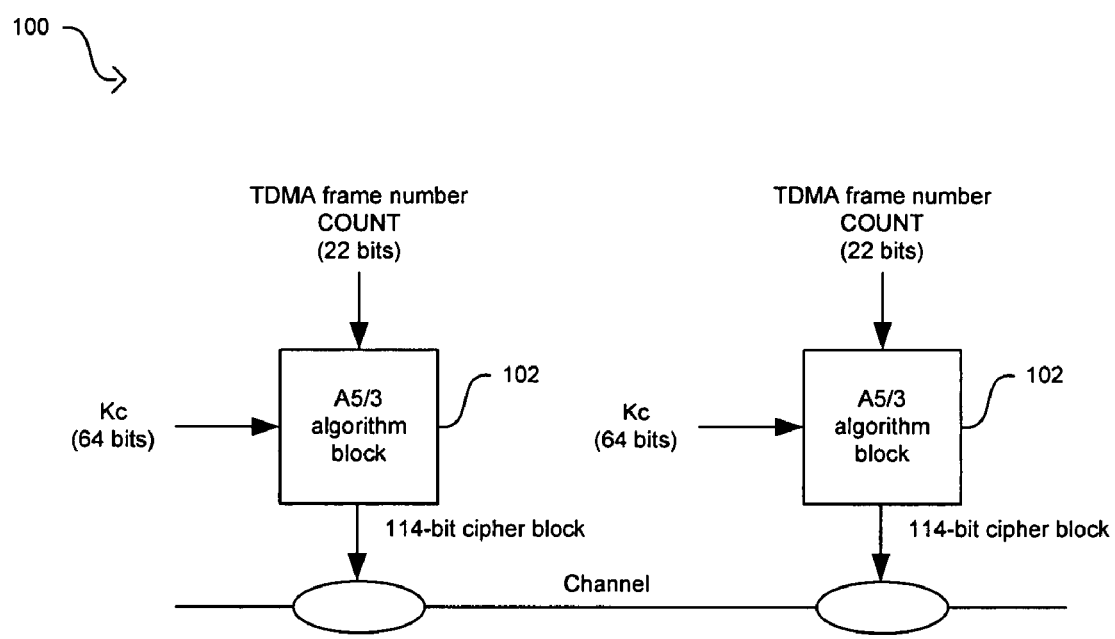
FIG. 1 is a block diagram of an exemplary A5/3 data encryption system for GSM communications, as disclosed in 3rd Generation Partnership Project, Technical Specification Group Services and System Aspects, 3G Security, Specification of the A5/3 Encryption Algorithms for GSM and ECSD, and the GEA3 Encryption Algorithm for GPRS, Document 1, A5/3 and GEA3 Specifications, Release 6 (3GPP TS 55.216 V6.1.0, 2002-12).

FIG. 1 is a block diagram of an exemplary A5/3 data encryption system for GSM communications, as disclosed in 3rd Generation Partnership Project, Technical Specification Group Services and System Aspects, 3G Security, Specification of the A5/3 Encryption Algorithms for GSM and ECSD, and the GEA3 Encryption Algorithm for GPRS, Document 1, A5/3 and GEA3 Specifications, Release 6 (3GPP TS 55.216 V6.1.0, 2002-12). Referring to FIG. 1, the GSM encryption system 100 may comprise a plurality of A5/3 algorithm blocks 102. The A5/3 algorithm block 102 may be used for encryption and/or decryption and may be communicatively coupled to a wireless communication channel. The A5/3 algorithm block 102 may be used to encrypt data transmitted on a DCCH (Dedicated Control Channel) and a TCH (Traffic Channel). The inputs to the A5/3 algorithm block 102 may comprise a 64-bit privacy key, Kc, and a TDMA frame number COUNT. The COUNT parameter is a 22-bit wide input and each frame represented by the COUNT parameter is approximately 4.6 ms in duration. The COUNT parameter may take on decimal values from 0 to 4194304, and may have a repetition time of about 5 hours, which is close to the interval of a GSM hyper frame. For each frame, two outputs may be generated by the A5/3 algorithm block 102: BLOCK1 and BLOCK2. Because of the symmetry of the A5/3 stream cipher, the BLOCK1 output may be used, for example, for encryption by a Base Station (BS) and for decryption by a Mobile Station (MS) while the BLOCK2 output may be used for encryption by the MS and for decryption by the BS. In GSM mode, the BLOCK1 output and the BLOCK2 output are 114 bits wide each. In EDGE mode, the BLOCK1 output and the BLOCK2 output are 348 bits wide each.

Figure 2A:
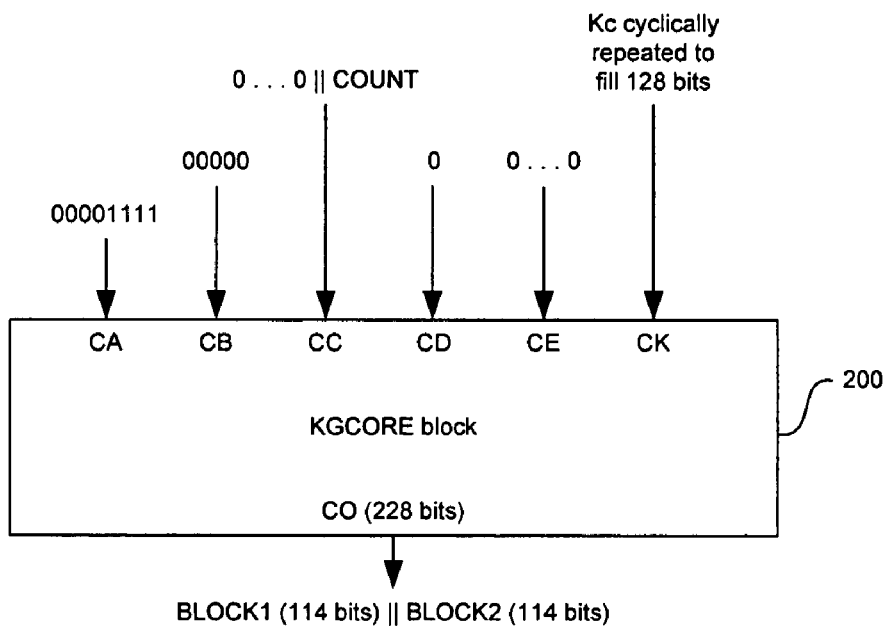
FIG. 2A is a diagram of an exemplary variable initialization for a general-purpose keystream generator function KGCORE to operate as a GSM A5/3 keystream generator function, which may be utilized in connection with an embodiment of the invention.

FIG. 2A is a diagram of an exemplary set-up for a KGCORE block to operate as a GSM A5/3 keystream generator function, which may be utilized in connection with an embodiment of the invention. Referring to FIG. 2A, the KGCORE function block 200 may receive as inputs a CA parameter, a CB parameter, a CC parameter, a CD parameter, a CE parameter, a CK parameter, and a CL parameter. The KGCORE function block 200 may produce an output defined by a CO parameter. The function or operation of the KGCORE function block 200 may be defined by the input parameters. The values shown in FIG. 2A may be used to map the inputs and outputs of the GSM variant of the A5/3 algorithm to the inputs and outputs of the KGCORE function. For example, the CL parameter specifies the number of output bits to produce, which for GSM applications is 128. In this case, the outputs CO[0] to CO[113] of the KGCORE function block 200 may map to the outputs BLOCK1[0] to BLOCK1[113] of the A5/3 algorithm. Similarly, the outputs CO[114] to CO[227] of the KGCORE function block 200 may map to the outputs BLOCK2[0] to BLOCK2[113] of the GSM variant of the A5/3 algorithm.

Figure 2B:
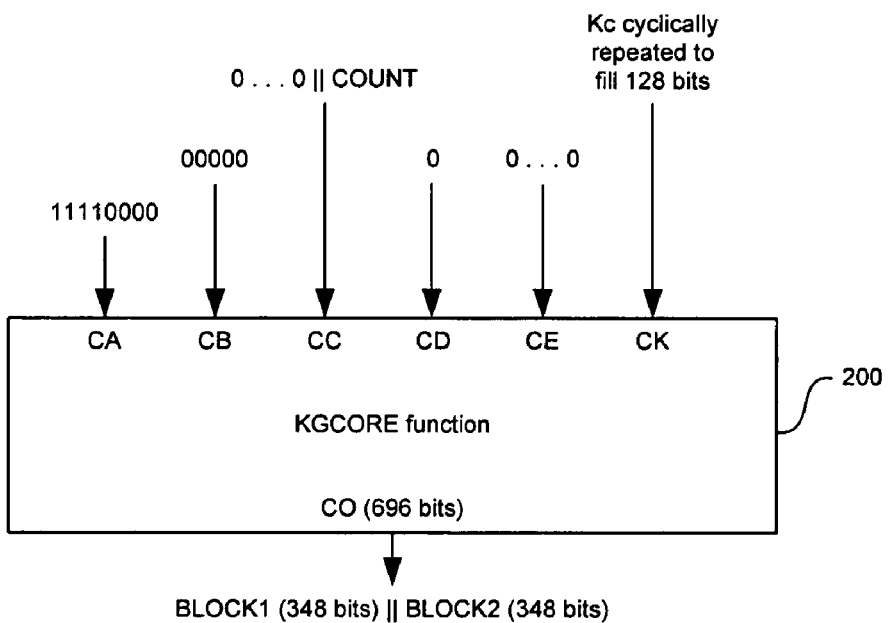
FIG. 2B is a diagram of an exemplary variable initialization for a general-purpose keystream generator function KGCORE to operate as an ECSD A5/3 keystream generator function, which may be utilized in connection with an embodiment of the invention.

FIG. 2B is a diagram of an exemplary set-up for a KGCORE block to operate as an ECSD A5/3 keystream generator function, which may be utilized in connection with an embodiment of the invention. Referring to FIG. 2A, the KGCORE function block 200 may receive as inputs a CA parameter, a CB parameter, a CC parameter, a CD parameter, a CE parameter, a CK parameter, and a CL parameter. The KGCORE function block 200 may produce an output defined by a CO parameter. The function or operation of the KGCORE function block 200 may be defined by the input parameters. The values shown in FIG. 2A may be used to map the inputs and outputs of the ECSD variant of the A5/3 algorithm to the inputs and outputs of the KGCORE function. For example, the CL parameter specifies the number of output bits to produce, which for GSM applications is 696. In this case, the outputs CO[0] to CO[347] of the KGCORE function block 200 may map to the outputs BLOCK1[0] to BLOCK1[347] of the A5/3 algorithm. Similarly, the outputs CO[348] to CO[695] of the KGCORE function block 200 may map to the outputs BLOCK2[0] to BLOCK2[347] of ECSD variant of the A5/3 algorithm.

Figure 3:
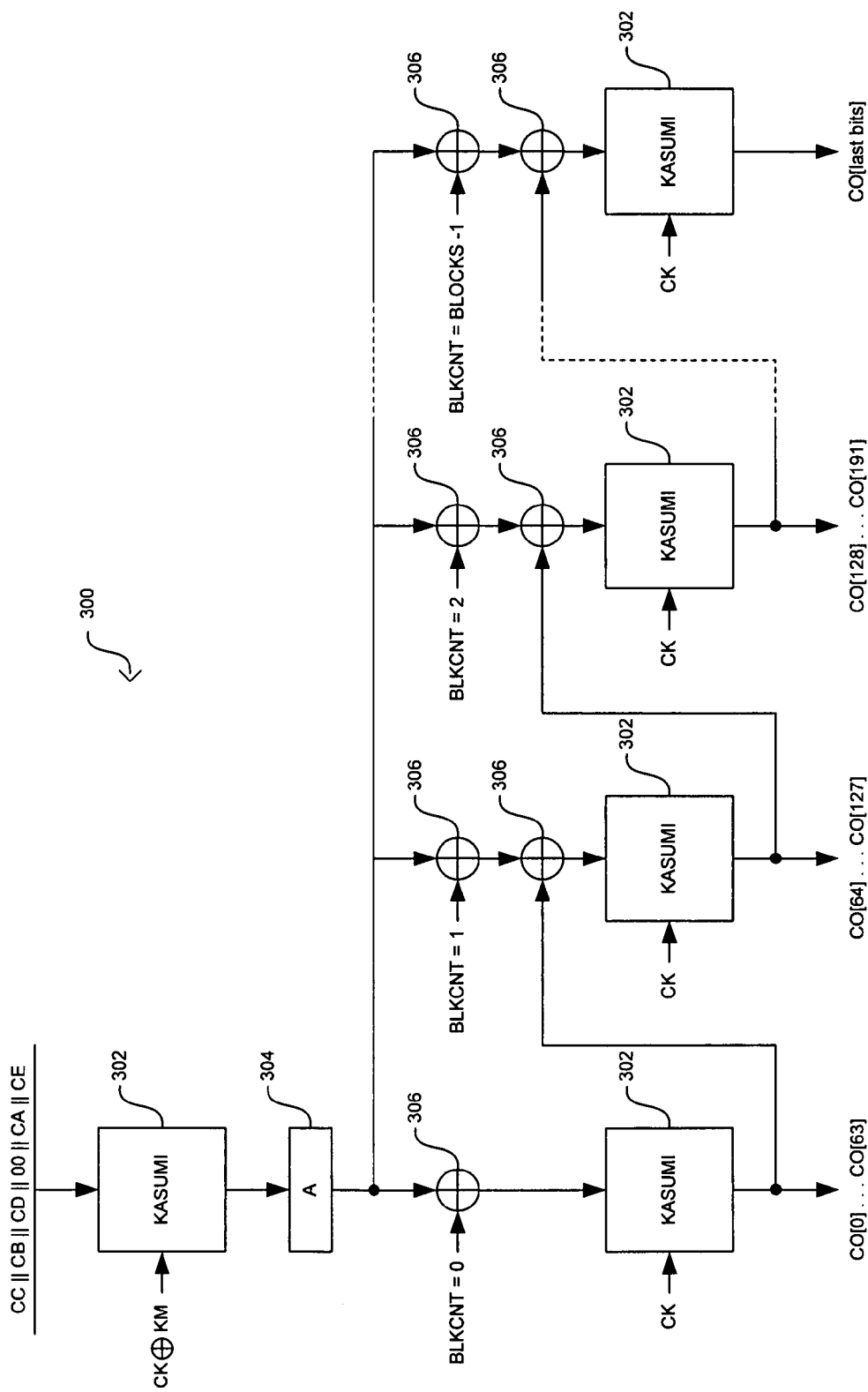
FIG. 3 is a flow diagram that illustrates the operation of a general-purpose keystream generator function KGCORE, which may be utilized in connection with an embodiment of the invention.

FIG. 3 is a flow diagram that illustrates the operation of a general-purpose keystream generator function KGCORE, which may be utilized in connection with an embodiment of the invention. Referring to FIG. 3, the general-purpose keystream generator function KGCORE 300 may comprise a plurality of KASUMI operations 302, a plurality of 64-bit XOR operations 306, and an intermediate value A register 304. The KASUMI operation 302 may comprise suitable logic, circuitry, and/or code that may be adapted to perform a KASUMI algorithm, where the KASUMI algorithm is a symmetric block cipher that produces a 64-bit output from a 64-bit input under the control of a 128-bit cipher key parameter CK. The 64-bit XOR operation 306 may comprise suitable logic, circuitry, and/or code that may be adapted to perform a bit-wise XOR operation on two 64-bit inputs to produce a 64-bit output. The intermediate value A register 304 may comprise suitable logic, circuitry, and/or code that may be adapted to store an intermediate value A generated by an initializing KASUMI operation that operates on a set of input variables to the general-purpose keystream generator function KGCORE 300 with a modified cipher key. The intermediate value A register 304 may be, for example, a 64-bit register.

In operation, the set of input variables that correspond to the variant of the A5/3 algorithm to be performed may be transferred to the general-purpose keystream generator function KGCORE 300. The set of input variables may comprise the parameters CA, CB, CC, CD, CD, CE, CL, and CK, where CA is an 8-bit input parameter, CB is a 5-bit input parameter, CC is a 32-bit input parameter, CD is a 1-bit input parameter, CE is a 16-bit input parameter, CL is an integer in the range $1 \ldots 2^{19}$ that specifies the numbers of output bits, and CK is a 128-bit input parameter that corresponds to a privacy or cipher key, Kc, and that may be utilized for encryption and decryption by the general-purpose keystream generator function KGCORE 300. The cipher key Kc may be of any length between 64 bits and 128 bits long, where the bit length of Kc may be provided by an input parameter KLEN. The data in parameters CA, CB, CC, CD, CD, and CE may be stored in the intermediate value A register 304 in the following order: A=CC∥CB∥CD∥0 0∥CA∥CE, where the ∥ operation represents concatenation and two zeros may be added between parameters CD and CA to complete the 64 bits of data in the intermediate value A register 304. The bit ordering of the parameters in the intermediate value A register 304 may be done from least significant bit to most significant bit, for example, A[0] ... A[63]=CC[0] ... CC[31] CB[0] ... CB[4] CD[0] 0 0 CA[0] ... CA[7] CE[0] ... CE[15].

The input variables to the general-purpose keystream generator function KGCORE 300 may be initialized to map to the inputs of the GSM variant of the A5/3 algorithm:
CA[0] ... CA[7]=0 0 0 1 1 1 1,
CB[0] ... CB[4]=0 0 0 0 0,
CC[0] ... CC[9]=0 0 0 0 0 0 0 0 0 0,
CC[10] ... CC[31]=COUNT[0] ... COUNT[21],
CD[0]=0,
CE[0] ... CE[15]=0 0 0 0 0 0 0 0 0 0 0 0 0 0 0 0, and
CL=228, where a portion of the CC parameter may be initialized to correspond to the 22-bit wide COUNT parameter. The cipher key parameter CK may be initialized to correspond to the privacy or cipher key Kc as follows: CK[0] ... CK[KLEN−1]=$K_C$[0] ... $K_C$[KLEN−1]. For the case when KLEN<128, then CK[KLEN] ... CK[127]=$K_C$[0] ... $K_C$[127−KLEN], so that for KLEN=64, then CK=$K_C$∥$K_C$.

Moreover, the outputs of the general-purpose keystream generator function KGCORE 300 may be initialized to map to the outputs of the GSM variant of the A5/3 algorithm:
BLOCK1[0] ... BLOCK1[113]=CO[0] ... CO[113], and
BLOCK2[0] ... BLOCK2[113]=CO[114] ... CO[227], where BLOCK1 and BLOCK2 correspond to 114-bit strings of keystream bits output by the GSM variant of the A5/3 algorithm and CO is a 228-bit output parameter of the general-purpose keystream generator function KGCORE 300.

Similarly, the input variables to the general-purpose keystream generator function KGCORE 300 may be initialized to map to the inputs of the ECSD variant of the A5/3 algorithm:
CA[0] ... CA[7]=1 1 1 1 0 0 0 0
CB[0] ... CB[4]=0 0 0 0 0
CC[0] ... CC[9]=0 0 0 0 0 0 0 0 0 0
CC[10] ... CC[31]=COUNT[0] ... COUNT[21]
CD[0]=0
CE[0] ... CE[15]=0 0 0 0 0 0 0 0 0 0 0 0 0 0 0 0, and
CL=696, where a portion of the CC parameter may be initialized to correspond to the 22-bit wide COUNT parameter. The cipher key parameter CK may be initialized to correspond to the privacy or cipher key Kc as follows: CK[0] ... CK[KLEN−1]=$K_C$[0] ... $K_C$[KLEN−1]. For the case when KLEN<128, then CK[KLEN] ... CK[127]=$K_C$[0] ... $K_C$[127−KLEN], so that for KLEN=64, then CK=$K_C$∥$K_C$.

Moreover, the outputs of the general-purpose keystream generator function KGCORE 300 may be initialized to map to the outputs of the ECSD variant of the A5/3 algorithm:
BLOCK1[0] ... BLOCK1[347]=CO[0] ... CO[347], and
BLOCK2[0] ... BLOCK2[347]=CO[348] ... CO[695], where BLOCK1 and BLOCK2 correspond to 348-bit strings of keystream bits output by the ECSD variant of the A5/3 algorithm and CO is a 696-bit output parameter of the general-purpose keystream generator function KGCORE 300.

After initializing the input variables, an initializing KASUMI operation may be performed by a KASUMI operation 302 on the initialized data stored in the intermediate value A register 304. The initializing Kasumi operation may be represented as follows:

$$A = \text{KASUMI}[A]_{MCK},$$

where a KASUMI operation 302 may be performed on the initialized data in the intermediate value A register 304 utilizing a modified cipher key parameter MCK and the result of the KASUM operation may be stored back into the intermediate value A register 304 for further processing. The cipher key parameter CK may be modified by a key modifier KM to obtain the modified cipher key parameter MCK, where MCK=CK⊕KM and ⊕ corresponds to a bit-wise XOR operation. The key modifier KM may be a 128-bit input variable, for example, KM=0× 55555555555555555555555555555555.

Once the general-purpose keystream generator function KGCORE 300 has been initialized for either GSM or ECSD applications, at least one processing stage may be initiated to generate the output bits for the output keystream. The general-purpose keystream generator function KGCORE 300 may produce output bits in blocks of 64 bits at a time. Each processing stage in the general-purpose keystream generator function KGCORE 300 may correspond to the generation of a processing block of 64 output bits. Because the number of output bits in the output keystream may not be a multiple of 64, the total number of processing stages or processing blocks of outputs bits for a particular application may be determined by rounding up the ratio CL/64 to the nearest integer. For example, when CL=128, the total number of processing stages or processing blocks of output bits is 2. In another example, when CL=135, the total number of processing stages or processing blocks of output bits is 3. In this latter case, the 7 most significant bits of the last processing block of output bits may be utilized while the remaining 57 least significant bits may be discarded. In the case of GSM applications, where CL=228, the number of processing stages is 4. The 28 least significant bits of the last processing block of output bits are discarded in GSM applications. Similarly, for ECSD applications, where CL=696, the number of processing stages is 11. The 8 least significant bits of the last processing block of output bits are discarded in ECSD applications.

Each processing block of output bits (KSB) may be generated by performing the following KASUMI operation:

$$KSB_n = KASUMI[A \oplus BLKCNT \oplus KSB_{n-1}]_{CK} \text{ for } 1 \leq n \leq BLOCKS,$$

where $KSB_n$ corresponds to the processing block of output bits in a current processing stage n, $KSB_{n-1}$ corresponds to the processing block of output bits from an immediately previous processing stage n−1, A is the intermediate value stored in the intermediate value A register 304, CK is the cipher key parameter generated from the cipher key Kc during the initialization process, BLOCKS is a parameter that corresponds to the total number of processing stages or processing blocks of output bits to be generated, and BLKCNT, where BLKCNT=n−1, is an indication of the processing stage or processing block of output bits currently being processed. The KASUMI operation and the XOR operations described for generating the processing blocks of output bits KSBN may be performed by the KASUMI operation 302 and by the 64-bit XOR operation 306 respectively.

When generating a first processing block of output bits ($KSB_1$) in a first processing stage, the processing input to the KASUMI operation 302 may be generated based on the values BLKCNT=0 and $KSB_0$=0, where the value 0 may be assigned to BLKCNT and $KSB_0$ during the initialization process. When generating additional processing blocks of output bits, for example, when generating a second processing block of output bits ($KSB_2$) in a second processing stage, the processing input to the KASUMI operation 302 may be generated based on the values BLKCNT=1 and $KSB_1$, where $KSB_1$ is the processing block of output bits from the first processing stage. A similar approach may be followed until the total number of processing stages are completed, where the total number of processing stages has been determined from parameter CL. For example, for the last processing stage, the processing input to the KASUMI operation 302 may be generated based on the values BLKCNT=BLOCKS−1 and $KSB_{BLOCKS-1}$.

Each bit in a processing block of output bits KSB may be mapped to a bit in the output parameter CO in the following manner:

$$CO[((n-1)*64)+i] = KSB_n[i] \text{ for } 1 \leq n \leq BLOCKS \text{ and } 0 \leq i \leq 63,$$

where n corresponds to the current processing block of output bits under consideration, and i is a mapping index. Referring back to FIG. 3, the first stage of processing may generate a first processing block of output bits $KSB_1[0] \ldots KSB_1[63]$=$CO[0] \ldots CO[63]$. The second stage of processing may generate a second processing block of output bits $KSB_2$ [0] $\ldots KSB_2[63]$=$CO[64] \ldots CO[127]$. For GSM applications, the last processing stage may generate a last processing block of output bits $KSB_4[0] \ldots KSB_4[35]$=$CO[192] \ldots CO[227]$, where $KSB_4[36] \ldots KSB_4[63]$ may be discarded. Similarly, for ECSD applications, the last processing stage may generate a last processing block of output bits $KSB_{11}[0] \ldots KSB_{11}[55]$=$CO[640] \ldots CO[695]$, where $KSB_{11}[56] \ldots KSB_{11}[63]$ may be discarded.

Figure 4:
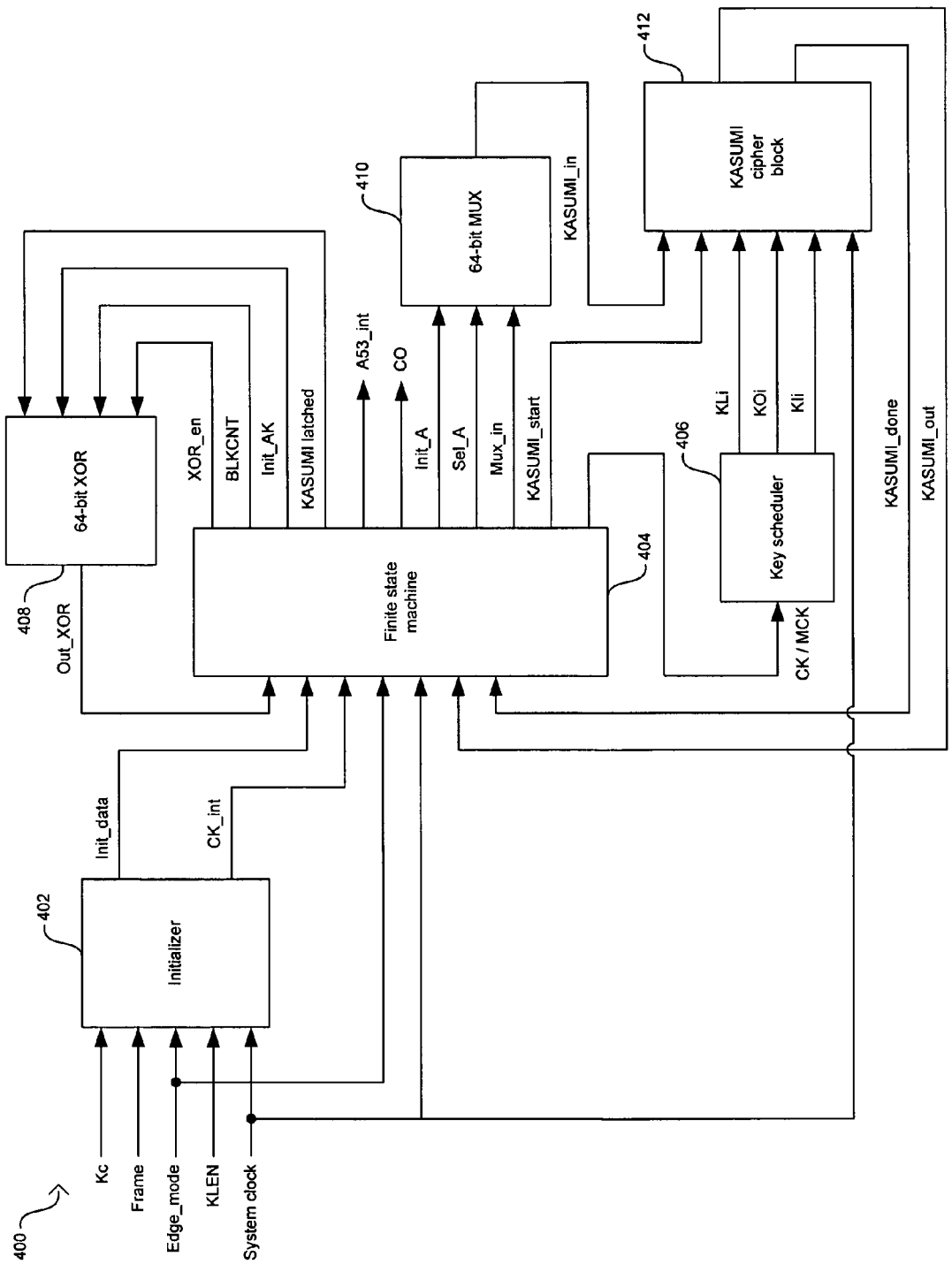
FIG. 4 is a block diagram of an exemplary A5/3 keystream generating system for operating the general-purpose keystream generator function KGCORE as a GSM and ECSD A5/3 keystream generator function, in accordance with an embodiment of the invention.

FIG. 4 is a block diagram of an exemplary A5/3 keystream generating system for operating the general-purpose keystream generator function KGCORE as a GSM and ECSD A5/3 keystream generator function, in accordance with an embodiment of the invention. Referring to FIG. 4, the A5/3 keystream generating system 400 may comprise an initializer 402, a finite state machine 404, a key scheduler 406, a 64-bit XOR 408, a 64-bit MUX 410, and a KASUMI cipher block 412. The initializer 402 may comprise suitable logic, circuitry, and/or code that may be adapted to map the inputs of the GSM or ECSD variant of the A5/3 algorithm to the inputs of the general-purpose keystream generator function KGCORE 300. The finite state machine 404 may comprise suitable logic, circuitry, and/or code that may be adapted to control the operation and data processing flow of the A5/3 keystream generating system 400. The finite state machine 404 may receive a plurality of input signals and may generate a plurality of output signals in order to perform the operation control and data processing flow control of the A5/3 keystream generating system 400. The finite state machine 404 may be configured and/or adapted to accommodate modifications and/or changes in the specifications of the A5/3 encryption algorithm for GSM and ECSD applications.

The key scheduler 406 may comprise suitable logic, circuitry, and/or code that may be adapted to generate a set of subkeys KLi, KOi, and Kli from the cipher key parameter CK, where the set of subkeys may be utilized in the KASUMI algorithm of the KASUMI operation 302 in FIG. 3 and i is an index that corresponds to the current round of processing in the eight-round KASUMI algorithm. The key schedule 406 may generate at least a portion of the set of subkeys before the start of the KASUMI operation. The 64-bit XOR 408 may comprise suitable logic, circuitry, and/or code that may be adapted to perform a bit-wise XOR operation. A portion of the operation of the 64-bit XOR 408 may correspond to that of at least one 64-bit XOR operation 306 in FIG. 3. The 64-bit MUX 410 may comprise suitable logic, circuitry, and/or code that may be adapted to select the input to the KASUMI cipher block 412. The KASUMI cipher block 412 may comprise suitable logic, circuitry, and/or code that may be adapted to perform the KASUMI algorithm. A portion of the operation of the KASUMI cipher block 412 may correspond to that of at least one KASUMI operation 302 in FIG. 3.

In operation, the initializer 402 may receive the cipher key Kc, frame information, the KLEN parameter, an Edge_mode input signal, and a system clock. Additional input signals may also be received by the initializer 402. The initializer 402 may utilize the frame information and the Edge_mode input signal to generate an Init_data signal that corresponds to the initialized data for parameters CA, CB, CC, CD, CD, and CE. The Edge_mode input signal may indicate whether the A5/3 keystream generating system 400 is to operate in a GSM mode or an ECSD mode. The frame information may provide the initializer 402 with the COUNT parameter to initialize a portion of parameter CC. The initializer 402 may also generate a CK_init signal from the cipher key Kc and the KLEN parameter, where the CK_init signal may correspond to the cipher key parameter CK. The initialized input variables and the generated cipher key parameter Ck may be transferred to the finite state machine 404 for further processing.

The finite state machine 404 may receive the Edge_mode input signal and may utilize the Edge_mode input signal to determine the total number of processing stages to be performed or the total number of processing blocks of output bits to be generated based on whether the A5/3 keystream generating system 400 is to operate in GSM mode or in ECSD mode. The finite state machine 404 may generate the modified cipher key parameter (MCK) from the cipher key parameter CK and the key modifier KM and may transfer MCK to the key scheduler 406 to generate a set of subkeys that may be utilized for the initializing KASUMI operation. The finite state machine 404 may store the value of the key modifier KM.

The finite state machine 404 may select the Init_A signal to be multiplexed out of the 64-bit MUX 410 as the output signal KASUMI_in, where the Init_A input signal may correspond to the initialized input variables. The finite state machine 404 may generate the KASUMI_start signal to indicate to the KASUMI cipher block 412 that the KASUMI_in signal and the set of subkeys generated from the modified cipher key parameter MCK may be available for processing. The KASUMI cipher block 412 may generate the intermediate value A and may transfer the results to the finite state machine 404 through the KASUMI_out signal. The KASUMI cipher block 412 may also generate the KASUMI_done signal to indicate that the initializing KASUMI operation has been completed.

The finite state machine 404 may proceed to generate at least one processing block of output bits after the intermediate value A has been determined. For example, to generate the first processing block of output bits, KSB, the finite state machine 404 may transfer the cipher key parameter CK to the key scheduler 406 to generate a set of subkeys that may be utilized for the first KASUMI operation. The finite state machine 404 may enable the 64-bit XOR 408 via signal XOR_en to generate a first processing input to be utilized during a first processing stage to generate the first processing block of output bits $KSB_1$. The 64-bit XOR 408 may XOR the BLKCNT signal and the Init_AK signal to generate the first processing input, where BLKCNT=0 and Init_AK is the intermediate value A. The output Out_XOR from the 64-bit XOR 408 may be transferred to the finite state machine 404 where it may be transferred to the 64-bit MUX 410 as signal Mux_in.

The finite state machine 404 may select the Mux_in signal as the output signal KASUMI_in from the 64-bit MUX 410, where the Mux_in input signal may correspond to the first processing input. The finite state machine 404 may generate the KASUMI_start signal to indicate to the KASUMI cipher block 412 that the KASUMI_in signal and the set of subkeys generated from the cipher key parameter CK may be available for processing. The KASUMI cipher block 412 may generate the first processing block of output bits and may transfer the results to the finite state machine 404 through the KASUMI_out signal, where the finite state machine 404 may latch the values of the KASUMI_out signal for processing in the next processing stage. The KASUMI cipher block 412 may also generate the KASUMI_done signal to indicate that the KASUMI operation corresponding to the first processing stage has been completed. The finite state machine 404 may update the value of the BLKCNT signal after receiving the KASUMI_done signal from the KASUMI cipher 412 or after sending the KASUMI_start signal to the KASUMI cipher 412.

The finite state machine 404 may proceed to generate additional processing block of output bits after the first processing block of output bits has been determined. For example, to generate the second processing block of output bits, $KSB_2$, the KASUMI cipher block 412 may utilize the set of subkeys generated by the key scheduler 406 for the first KASUMI operation. The finite state machine 404 may enable the 64-bit XOR 408 via signal XOR_en to generate a second processing input to be utilized during a second processing stage to generate the second processing block of output bits $KSB_2$. The 64-bit XOR 408 may XOR the BLKCNT signal, the Init_AK signal, and the immediately previous processing block of output bits to generate the second processing input, where BLKCNT=1, Init_AK is the intermediate value A, and the immediately previous processing block of output bits $KSB_1$ corresponds to the latched KASUMI_out values from the previous processing stage. The output Out_XOR from the 64-bit XOR 408 may be transferred to the finite state machine 404 where it may be transferred to the 64-bit MUX 410 as signal Mux_in.

The finite state machine 404 may select the Mux_in signal as the output signal KASUMI_in from the 64-bit MUX 410, where the Mux_in input signal corresponds to the second processing input. The finite state machine 404 may generate the KASUMI_start signal to indicate to the KASUMI cipher block 412 that the set of subkeys generated from the cipher key parameter CK and the KASUMI_in signal may be available for processing. The KASUMI cipher block 412 may generate the second processing block of output bits and may transfer the results to the finite state machine 404 in the KASUMI_out signal. The KASUMI cipher block 412 may also generate the KASUMI_done signal to indicate that the KASUMI operation corresponding to the second processing stage has been completed. The finite state machine 404 may update the value of the BLKCNT signal after receiving the KASUMI_done signal from the KASUMI cipher 412 or after sending the KASUMI_start signal to the KASUMI cipher 412.

A similar approach may be followed for the remaining additional processing blocks of output bits. In this regard, the finite state machine 404 may follow the approach described above and control the operation and data flow control of the A5/3 keystream generating system 400 to generate a total of 4 processing blocks of output bits for GSM mode or 11 processing blocks of output bits for ECSD mode. The finite state machine 404 may generate the output parameter CO based on the output bits provided by each processing stage and may discard the appropriate bits in the last processing block of output bits. When all the output bits are generated, the finite state machine 404 may generate an A53_int interrupt signal to indicate that all the output bits for the output keystream have been generated and the A5/3 keystream generating system 400 is ready to start processing a new set of input variables. A system clock signal may be used during the initialization and during the processing stages to synchronize the operation of the initializer 402, the finite state machine 404, and the KASUMI cipher block 412.

Figure 5A:
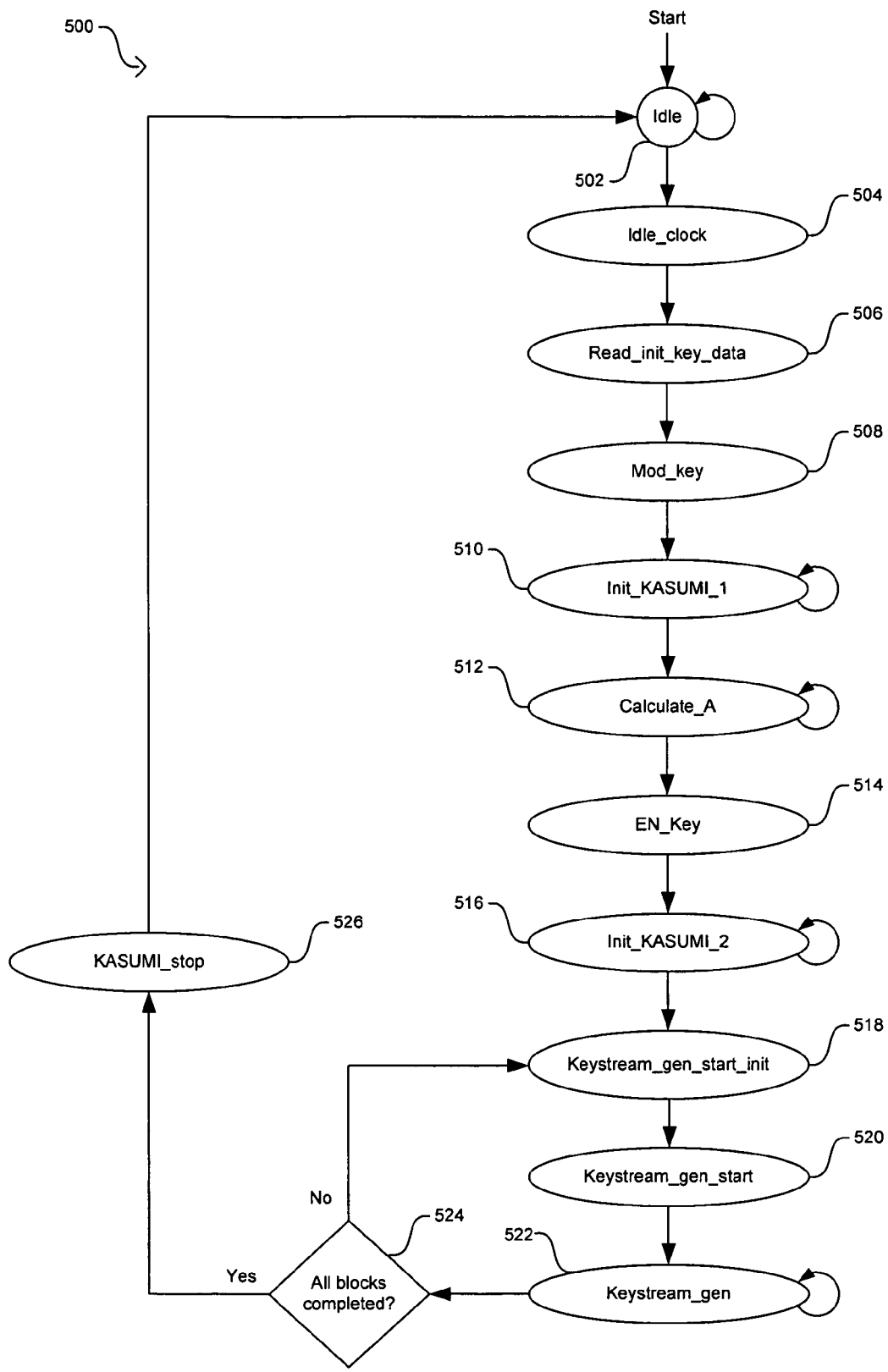
FIG. 5A is an exemplary state diagram illustrating the operation of the finite state machine in the A5/3 keystream generating system, in accordance with an embodiment of the invention.

FIG. 5A is an exemplary state diagram illustrating the operation of the finite state machine in the A5/3 keystream generating system, in accordance with an embodiment of the invention. Referring to FIG. 5, the finite state machine 404 may remain in an idle state 502 until a start signal is received. The start signal received in idle state 502 may be an asynchronous signal and may need to be synchronized to the system clock. Once the start signal is received, the finite state machine 404 may proceed to an idle_clock state 504, where the internal clocks in the finite state machine 404 may be powered up after being powered down previously to conserve energy while the A5/3 keystream generating system 400 was not in use. Once the internal clocks have been powered up, the start signal may be synchronized and the finite state machine 404 may proceed to a read_init_key_data state 506, where the cipher key parameter CK and the initialized data may be transferred from the initializer 402.

With the cipher key parameter CK available for processing, the finite state machine 404 may generate the modified cipher key parameter MCK in a mod_key state 508. After the modified cipher key parameter (MCK) has been determined, the finite state machine 404 may proceed to an init_KASUMI_1 state 510, where the set of subkeys for use during the initializing KASUMI operation may be determined by the key scheduler 406 in FIG. 4. The finite state machine 404 may remain in the init_KASUMI_1 state 510 for a specified amount of time, for example, two clock cycles, until the combinational logic in the key scheduler 406 completes generating all the subkeys. In another embodiment, the finite state machine 404 may require the key scheduler 406 to generate and transfer the subkeys to the KASUMI cipher block 412 in FIG. 4 during the initializing KASUMI operation instead of before the initializing KASUMI operation begins.

With the initializing subkeys available for processing, the finite state machine 404 may proceed to a calculate_A state 512, where the KASUMI cipher block 412 may determine the intermediate value A, may transfer the determined intermediate value A to the finite state machine 404, and may generate the KASUMI_done signal to indicate that the intermediate value A has been determined. After completing the calculate_A state 512, the finite state machine 404 may proceed to an en_key state 514, where the cipher key parameter CK may be transferred to the key scheduler 406. After the cipher key parameter CK is transferred to the key scheduler 406, the finite state machine 404 may proceed to an init_KASUMI_2 state 516, where the set of subkeys for use during the first processing stage and any of the additional processing stages may be determined by the key scheduler 406.

With the set of subkeys necessary to generate the output keystream available, the finite state machine 404 may proceed to a keystream_gen_start_init state 518, where the first processing stage may begin by setting the parameters BLKCNT and $KSB_0$ to zero. Following the keystream_gen_start_init state 518, the finite state machine 404 may proceed to a keystream_gen_start state 520, where the KASUMI_start signal may be generated to initiate the KASUMI operation in the KASUMI cipher block 412 for the first processing stage. The finite state machine 404 may then proceed to a keystream_gen state 522, where the KASUMI cipher block 412 may determine the first processing block of output bits, may transfer the first processing block of output bits to the finite state machine 404, and may generate the KASUMI_done signal to indicate that the first processing block of output bits has been generated.

In step 524, the finite state machine 404 may determine whether the last processing block of output bits has been determined for either the GSM mode or the ECSD mode by determining whether BLKCNT=BLOCKS−1 after the KASUMI_done signal is generated during the keystream_gen state 522. When the BLKCNT does not correspond to the last processing stage, as is the case when the current processing stage is that of the first processing block of output bits, the finite state machine 404 may proceed to the keystream_gen_start_init state 518 and update the BLKCNT and $KSB_{n-1}$ parameters for use during the next processing stage. Additional processing blocks of output bits may be determined by repeating the keystream_gen_start_init state 518, the keystream_gen_start state 520, and the keystream_gen state 522 for each of the additional processing stages. Referring back to step 524, when the BLKCNT corresponds to the last processing stage, the finite state machine 404 may proceed to a KASUMI_stop state 526, where the finite state machine 404 may generate the A53_int interrupt signal to indicate that all the output bits for the output keystream have been generated and the A5/3 keystream generating system 400 is ready to start processing a new set of input variables. In the KASUMI_stop state 526 the finite state machine 404 may generate the outputs BLOCK1 and BLOCK2 of the GSM or ECSD variant of the A5/3 algorithm from the CO parameters generated by the A5/3 keystream generating system 400. After generating the A53_int interrupt signal and the output keystream, the finite state machine 404 may return to the idle state 502 to wait for the next start signal to be received.

Figure 5B:
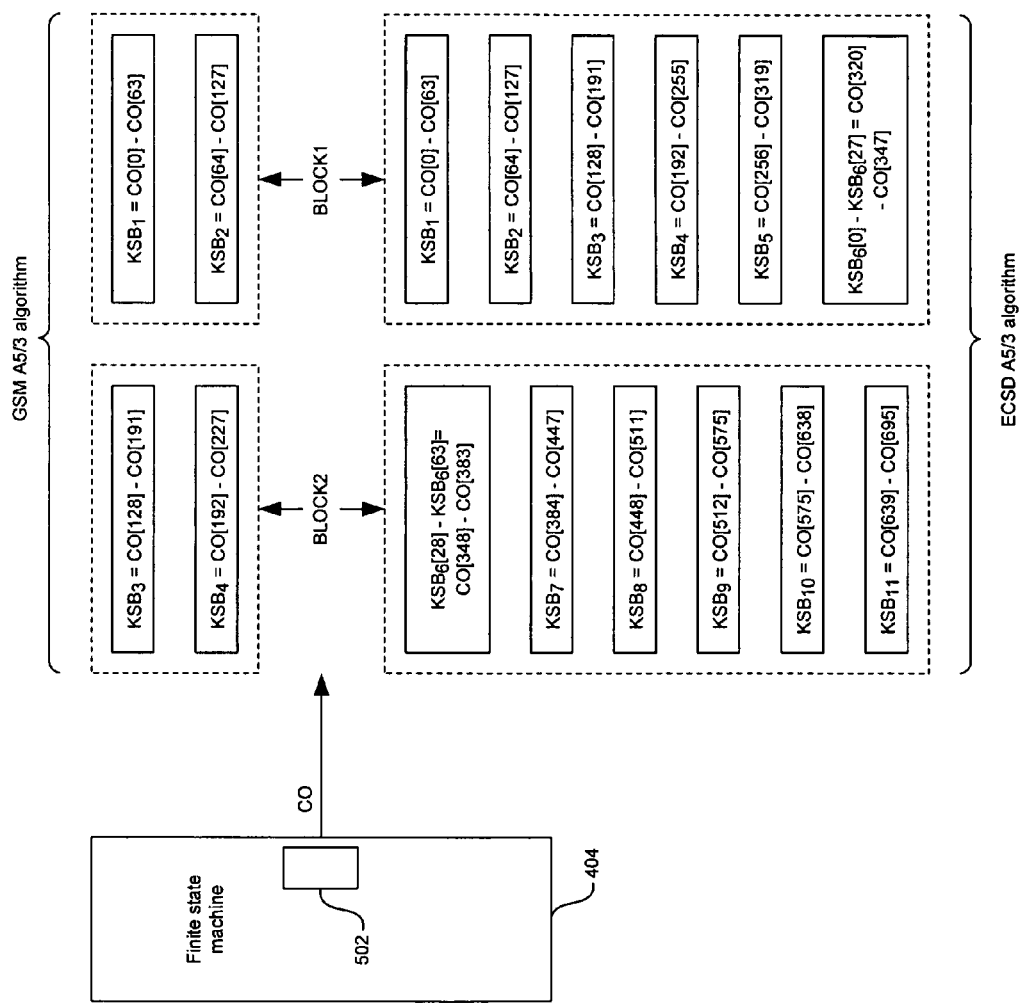
FIG. 5B illustrates the generation of exemplary BLOCK1 and BLOCK2 outputs by the finite state machine for GSM and ECSD applications, in accordance with an embodiment of the invention.

FIG. 5B illustrates the generation of exemplary BLOCK1 and BLOCK2 outputs by the finite state machine for GSM and ECSD applications, in accordance with an embodiment of the invention. Referring to FIG. 5B, the finite state machine 404 in FIG. 4 may also comprise an output buffer 502. The output buffer 502 may comprise suitable logic, circuitry, and/or code that may be adapted to group the output bits CO to generate the outputs BLOCK1 and BLOCK2 for both the GSM variant and the ECSD variant of the A5/3 algorithm. For GSM applications, the output buffer 502 may group the first and second processing blocks of output bits into BLOCK1 and the third and fourth processing blocks of output bits into BLOCK2. For ECSD applications, the output buffer 502 may group the first, second, third, fourth, fifth, and a portion of the sixth processing blocks of output bits into BLOCK1. The portion of the sixth processing block of output bits in BLOCK1 may comprise $KSB_6[0] \ldots KSB_6[27]$. Morevoer, the output buffer 502 may group the remaining portion of the sixth, seventh, eighth, ninth, tenth, and eleventh processing blocks of output bits into BLOCK2. The remaining portion of the sixth processing block of output bits in BLOCK2 may comprise $KSB_6[28] \ldots KSB_6[63]$. The outputs BLOCK1 and BLOCK2 may be provided in serial or parallel formats from the finite state machine 404. The finite state machine 404 may also provide additional timing and/or ordering information to delimit the outputs BLOCK1 and BLOCK2.

The approach described above may produce a cost effective IC solution capable of accelerating the encryption and decryption speed of GSM and EDGE variants of the A5/3 algorithm and allow for a faster deployment of next generation data services.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for implementing the A5/3 encryption algorithm, the method comprising:
    initializing a keystream generator with input variables;
    generating an intermediate value which is utilized to generate an output keystream, based on said input variables, a cipher key parameter and a key modifier;
    determining a number of processing blocks of output bits based on a number of output bits that are to be generated for said output keystream; and
    after generating a first processing block of output bits of said determined number of processing blocks of output bits and a signal indicating when said first processing block of output bits is generated, generating at least one additional processing block of output bits utilizing an immediately generated previous processing block of output bits, said generated intermediate value, said cipher key parameter, and an indication corresponding to a processing block of output bits being processed, wherein said generating of at least one additional processing block of output bits is done for all subsequent determined number of processing blocks of output bits after a signal indicating when an immediately generated previous processing block of output bits is generated.

2. The method according to claim 1, comprising pipelining transfer said immediately generated previous processing block of output bits from a previous processing stage to a current processing stage when said signal indicating when said immediately generated previous processing block of output bits is generated.

3. The method according to claim 1, comprising generating a modified cipher key parameter by XORing said cipher key parameter and said key modifier.

4. The method according to claim 3, comprising generating said intermediate value by performing a KASUMI operation on said input variables with said modified cipher key parameter after a signal is generated to indicate that said KASUMI operation is to begin.

5. The method according to claim 1, comprising generating a first processing input by XORing said generated intermediate value and said indication corresponding to a processing block of output bits being processed.

6. The method according to claim 5, comprising generating said first processing block of output bits by performing a KASUMI operation on said generated first processing input with said cipher key parameter after a signal is generated to indicate that said KASUMI operation is to begin.

7. The method according to claim 1, comprising generating at least one additional processing input by XORing said immediately generated previous processing block of output bits with the result of XORing said generated intermediate value and said indication corresponding to a processing block of output bits being processed.

8. The method according to claim 7, comprising generating said at least one additional processing block of output bits by performing a KASUMI operation on said generated at least one additional processing input with said cipher key parameter after a signal is generated to indicate that said KASUMI operation is to begin.

9. The method according to claim 1, comprising generating at least a portion of a set of subkeys utilized during a KASUMI operation from said cipher key parameter after a signal is generated to indicate that said at least a portion of a set of subkeys is to be generated.

10. The method according to claim 1, comprising selecting between said input variables and at least one generated processing input as an input to a KASUMI operation.

11. The method according to claim 1, comprising generating said indication corresponding to a processing block of output bits being processed by counting the number of occurrences of said signal indicating when an immediately generated previous processing block of output bits is generated.

12. The method according to claim 1, comprising generating two final blocks of output bits after a signal is generated to indicate that a final processing block of output bits is generated, wherein a first of said two final blocks of output bits comprises a portion of said number of output bits and a second of said two final blocks of output bits comprises a remaining portion of said number of output bits.

13. The method according to claim 12, comprising generating said signal indicating that a final processing block of output bits is generated when said indication corresponding to a processing block of output bits being processed corresponds to a last of said determined number of processing blocks of output bits.

14. The method according to claim 1, wherein said determined number of processing blocks of output bits is 4 for GSM applications.

15. The method according to claim 1, wherein said determined number of processing blocks of output bits is 11 for ECSD applications.

16. A system for implementing the A5/3 encryption algorithm, the system comprising:
    one or more circuits that enable initializing a keystream generator with input variables;
    said one or more circuits enable generating an intermediate value which is utilized to generate an output keystream, based on said input variables, a cipher key parameter and a key modifier;
    said one or more circuits enable determining a number of processing blocks of output bits based on a number of output bits that are to be generated for said output keystream;
    said one or more circuits enable generating a first processing block of output bits of said determined number of processing blocks of output bits and a signal indicating when said first processing block of output bits is generated;
    said one or more circuits enable generating at least one additional processing block of output bits utilizing an immediately generated previous processing block of output bits, said generated intermediate value, and an indication corresponding to a processing block of output bits being processed, wherein said generating of at least one additional processing block of output bits is done for all subsequent determined number of processing blocks of output bits after a signal indicating when an immediately generated previous processing block of output bits is generated.

17. The system according to claim 16, wherein said one or more circuits enable pipelining transfer said immediately generated previous processing block of output bits from a previous processing stage to a current processing stage when said signal indicating when said immediately generated previous processing block of output bits is generated.

18. The system according to claim 16, wherein said one or more circuits enable generating a modified cipher key parameter by XORing said cipher key parameter and said key modifier.

19. The system according to claim 18, wherein said one or more circuits enable generating said intermediate value by performing a KASUMI operation on said input variables with said modified cipher key parameter after a signal is generated to indicate that said KASUMI operation is to begin.

20. The system according to claim 16, wherein said one or more circuits enable generating a first processing input by XORing said generated intermediate value and said indication corresponding to a processing block of output bits being processed.

21. The system according to claim 20, wherein said one or more circuits enable generating said first processing block of output bits by performing a KASUMI operation on said generated first processing input with said cipher key parameter after a signal is generated to indicate that said KASUMI operation is to begin.

22. The system according to claim 16, wherein said one or more circuits enable generating at least one additional processing input by XORing said immediately generated previous processing block of output bits with the result of XORing said generated intermediate value and said indication corresponding to a processing block of output bits being processed.

23. The system according to claim 22, wherein said one or more circuits enable generating said at least one additional processing block of output bits by performing a KASUMI operation on said generated at least one additional processing input with said cipher key parameter after a signal is generated to indicate that said KASUMI operation is to begin.

24. The system according to claim 16, wherein said one or more circuits enable generating at least a portion of a set of subkeys utilized during a KASUMI operation from said cipher key parameter after a signal is generated to indicate that said at least a portion of a set of subkeys is to be generated.

25. The system according to claim 16, wherein said one or more circuits enable selecting between said input variables and at least one generated processing input as an input to a KASUMI operation.

26. The system according to claim 16, wherein said one or more circuits enable generating said indication corresponding to a processing block of output bits being processed by counting the number of occurrences of said signal indicating when an immediately generated previous processing block of output bits is generated.

27. The system according to claim 16, wherein said one or more circuits enable generating two final blocks of output bits after a signal is generated to indicate that a final processing block of output bits is generated, wherein a first of said two final blocks of output bits comprises a portion of said number of output bits and a second of said two final blocks of output bits comprises a remaining portion of said number of output bits.

28. The system according to claim 27, wherein said one or more circuits enable generating said signal indicating that a final processing block of output bits is generated when said indication corresponding to a processing block of output bits being processed corresponds to a last of said determined number of processing blocks of output bits.

29. The system according to claim 16, wherein said determined number of processing blocks of output bits is 4 for GSM applications.

30. The system according to claim 16, wherein said determined number of processing blocks of output bits is 11 for ECSD applications.

\* \* \* \* \*

UNITED STATES PATENT AND TRADEMARK OFFICE
CERTIFICATE OF CORRECTION

| | |
|---|---|
| PATENT NO. | : 7,623,658 B2 |
| APPLICATION NO. | : 10/924214 |
| DATED | : November 24, 2009 |
| INVENTOR(S) | : Suen et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1462 days.

Signed and Sealed this

Twenty-sixth Day of October, 2010

David J. Kappos
*Director of the United States Patent and Trademark Office*